US010047769B2

(12) United States Patent
Jeon

(10) Patent No.: US 10,047,769 B2
(45) Date of Patent: Aug. 14, 2018

(54) FLOW CONTROL VALVE FOR CONSTRUCTION EQUIPMENT

(71) Applicant: VOLVO CONSTRUCTION EQUIPMENT AB, Eskilstuna (SE)

(72) Inventor: Man-Seuk Jeon, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 0 days.

(21) Appl. No.: 15/307,175

(22) PCT Filed: Apr. 29, 2014

(86) PCT No.: PCT/KR2014/003791
§ 371 (c)(1),
(2) Date: Oct. 27, 2016

(87) PCT Pub. No.: WO2015/167041
PCT Pub. Date: Nov. 5, 2015

(65) Prior Publication Data
US 2017/0114806 A1 Apr. 27, 2017

(51) Int. Cl.
*F16K 31/12* (2006.01)
*F15B 11/08* (2006.01)
(Continued)

(52) U.S. Cl.
CPC ............ *F15B 11/08* (2013.01); *E02F 9/2221* (2013.01); *F15B 13/0402* (2013.01); *F15B 13/0433* (2013.01)

(58) Field of Classification Search
CPC .... F15B 11/08; F15B 11/163; F15B 13/0433; F15B 13/0402; F15B 13/0403;
(Continued)

(56) References Cited

U.S. PATENT DOCUMENTS 3,534,774 A * 10/1970 Tennis ................ F15B 13/0403 137/596
3,939,870 A * 2/1976 Guigliano ........... F15B 13/0402 137/624.27

(Continued)

FOREIGN PATENT DOCUMENTS

CN 1119717 A 4/1996
CN 103189656 A 7/2013

(Continued)

OTHER PUBLICATIONS

International Search Report (in English and Korean) for PCT/KR2014/003791, dated Jan. 20, 2015; ISA/KR.

(Continued)

*Primary Examiner* — Minh Le
(74) *Attorney, Agent, or Firm* — Harness, Dickey & Pierce, P.L.C.

(57) ABSTRACT

Disclosed is a flow control valve for a construction equipment for controlling the amount of oil supplied to a hydraulic actuator from a hydraulic pump. The flow control valve for the construction equipment, according to the present invention comprises: a valve body installed on the path between a hydraulic pump and a hydraulic actuator and configured with a supply path communicating with a pump path supplying the hydraulic oil from the hydraulic pump and the actuator ports connected to the hydraulic actuator; a switchable spool provided within the valve body; a pressure chamber provided within the spool, which communicates with the supply path and the actuator port on one side; a signal pressure path provided within the spool, which communicates with the actuator port on the other side and the pressure chamber; and a flow control valve provided within the pressure chamber, wherein when the pressure of the hydraulic oil returning to the hydraulic oil tank from the hydraulic actuator exceeds the predetermined pressure, the (Continued)

flow control valve is switched by the returning oil supplied through the signal pressure path and blocks the opening part.

5 Claims, 3 Drawing Sheets

(51) Int. Cl.
*E02F 9/22* (2006.01)
*F15B 13/04* (2006.01)
*F15B 13/043* (2006.01)

(58) Field of Classification Search
CPC .... F15B 13/0418; F15B 13/01; E02F 9/2221; F16K 11/07
USPC ........ 137/596.17, 596.14, 596.1, 596.2, 487, 137/491, 625.35, 625.38, 625.69; 91/526, 91/527
See application file for complete search history.

(56) References Cited

U.S. PATENT DOCUMENTS

| | | | | | |
|---|---|---|---|---|---|
| 3,998,134 | A * | 12/1976 | Budzich | F15B 11/0445 137/115.04 |
| 4,531,546 | A * | 7/1985 | Barr | F15B 13/04 137/625.48 |
| 5,188,147 | A | 2/1993 | Shirai et al. | |
| 5,394,903 | A * | 3/1995 | Tominaga | F15B 13/08 137/596.13 |
| 5,433,076 | A | 7/1995 | Sugiyama et al. | |
| 5,615,705 | A * | 4/1997 | Cho | E02F 9/2217 137/596.2 |
| 6,327,959 | B1 * | 12/2001 | Takahashi | E02F 9/2267 137/625.68 |
| 6,868,672 | B2 * | 3/2005 | Luo | E02F 9/2207 60/468 |
| 7,337,807 | B2 * | 3/2008 | Koo | F15B 13/021 137/625.66 |
| 8,733,391 | B2 | 5/2014 | Jeon | |
| 8,806,860 | B2 | 8/2014 | Kawasaki et al. | |
| 8,851,119 | B2 * | 10/2014 | Fujiwara | F16K 11/07 137/625.66 |
| 9,103,355 | B2 | 8/2015 | Ku et al. | |
| 9,249,812 | B2 | 2/2016 | Jeon et al. | |
| 9,261,114 | B2 * | 2/2016 | Kim | E02F 9/2239 |
| 2011/0192474 | A1 | 8/2011 | Kobayashi et al. | |
| 2011/0271669 | A1 | 11/2011 | Kawasaki et al. | |
| 2013/0228245 | A1 | 9/2013 | Ku et al. | |
| 2015/0013804 | A1 * | 1/2015 | Pieper | F16K 11/0704 137/624.27 |
| 2015/0013805 | A1 * | 1/2015 | Terao | F16K 11/07 137/625.6 |
| 2015/0113970 | A1 | 4/2015 | Jeon | |
| 2015/0167699 | A1 * | 6/2015 | Terao | F15B 13/0403 91/436 |
| 2015/0377259 | A1 | 12/2015 | Jeon | |
| 2016/0201297 | A1 | 7/2016 | Jeon | |

FOREIGN PATENT DOCUMENTS

| | | | |
|---|---|---|---|
| EP | 1 391 307 | A1 | 10/1990 |
| EP | 2 644 905 | A1 | 10/2013 |
| GB | 2 313 412 | A | 11/1997 |
| JP | 2007032782 | A | 2/2007 |
| KR | 1020110093934 | A | 8/2011 |
| KR | 1020130133773 | A | 12/2013 |
| WO | WO-2012-129042 | A1 | 9/2012 |

OTHER PUBLICATIONS

Extended European Search Report for Application No. EP 14 89 1075 dated Nov. 7, 2017 (8 pages).

* cited by examiner

[Fig. 1]
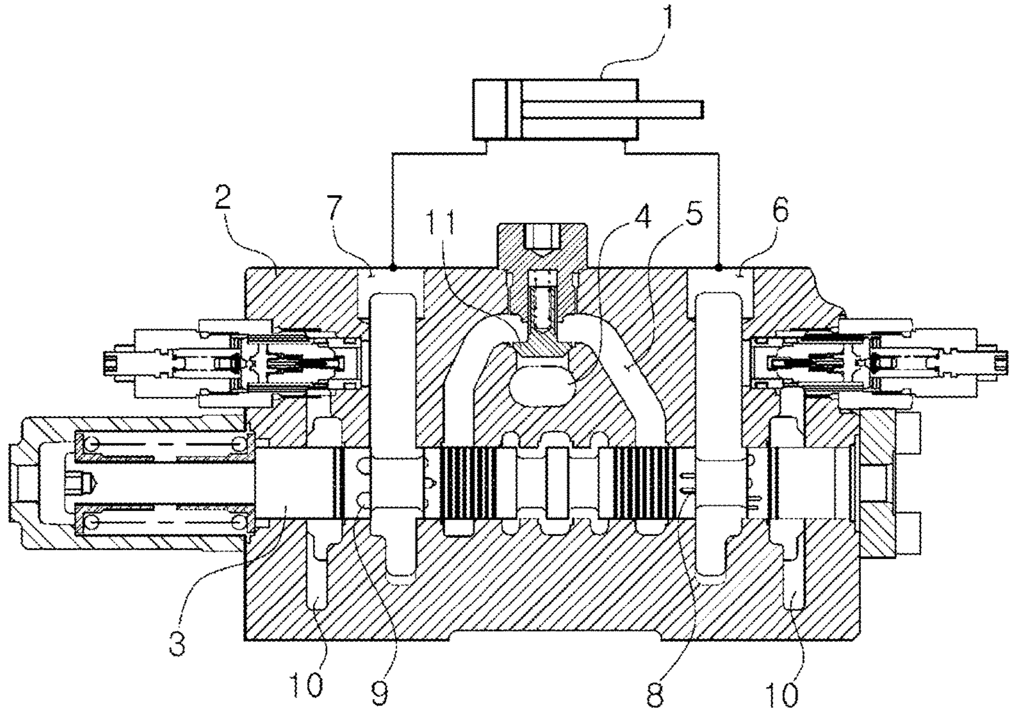
Prior Art

[Fig. 2]
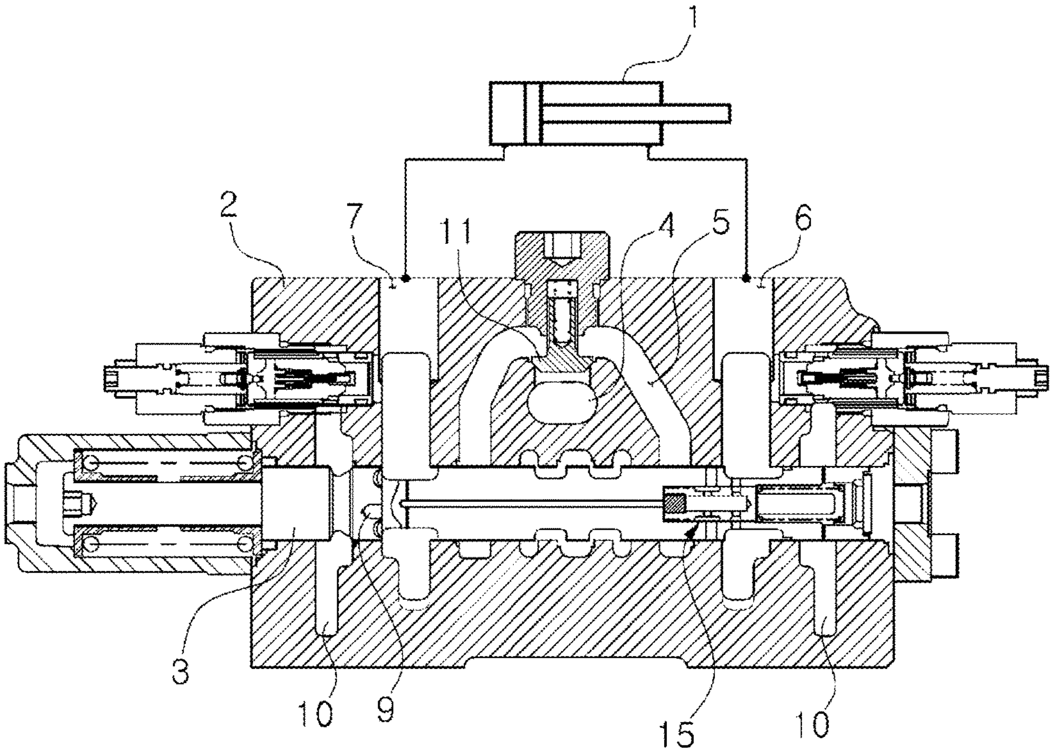

[Fig. 3]
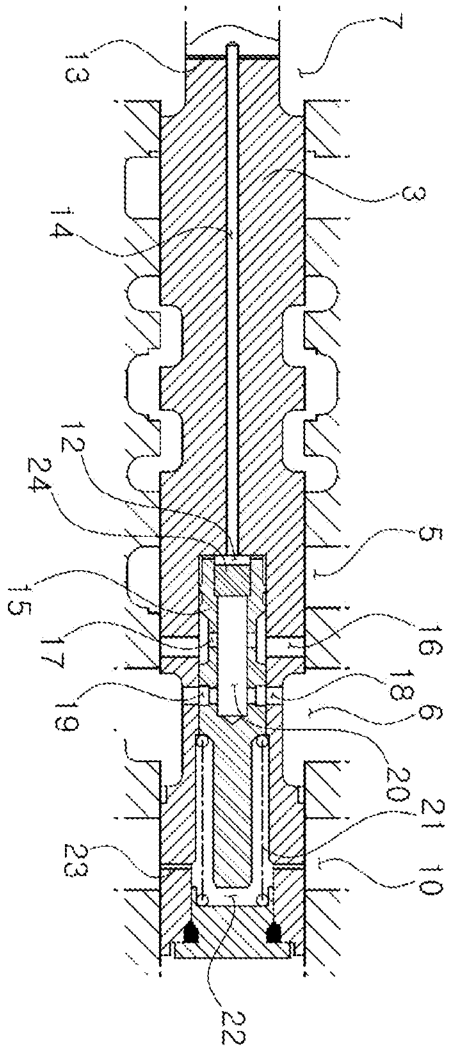

FLOW CONTROL VALVE FOR CONSTRUCTION EQUIPMENT

CROSS-REFERENCE TO RELATED APPLICATIONS

This application is a 371 U. S. National Stage of International Application No. PCT/KR2014/003791, filed on Apr. 29, 2014. The entire disclosure of the above application is incorporated herein by reference.

TECHNICAL FIELD

The present invention relates to a construction equipment and more particularly, a flow control valve of a construction equipment for controlling a flow rate supplied from a hydraulic pump to a hydraulic actuator.

BACKGROUND OF THE INVENTION

A flow control valve of a construction equipment as shown in FIG. 1 according to the conventional technology has a valve body (2) installed on the path between a hydraulic pump (not shown) and a hydraulic actuator (1). A switchable spool (3) is provided within the valve body (2) so that by switching, a hydraulic oil of the hydraulic pump can be supplied to the hydraulic actuator (1) and a hydraulic oil discharged from the hydraulic actuator (1) can return to a hydraulic oil tank (not shown).

Within the valve body (2) are provided a pump path (4) supplying the hydraulic oil from the hydraulic pump, a supply path (5) communicating with the pump path (4) and the actuator ports (6, 7) connected to the hydraulic actuator (1).

In the flow control valve as describe above, the spool (3) is shifted to the left side in the figure when the pilot signal pressure is applied in the right side of the spool (3). At this time, a check valve (11) is moved upwards in the figure and opened by the hydraulic oil supplied to the pump path (4) from the hydraulic pump.

Accordingly, the hydraulic oil supplied to the pump path (4) is delivered to the hydraulic actuator (1) by way of the supply path (5), a spool notch (8), and the actuator port (6) in order. At the same time, the hydraulic oil discharged from the hydraulic actuator (1) returns to the hydraulic oil tank by way of the actuator port (7), a spool notch (9), and a tank path (10) in order. Thus, the hydraulic actuator (1) is actuated in contraction.

If the hydraulic actuator (1) is the boom cylinder that makes the boom up and down, the boom cylinder is actuated in contraction due to the weight of the boom itself before the bucket digs into the ground, even though the hydraulic oil is not supplied to the small chamber of the cylinder. Therefore, the contraction of the boom cylinder makes the hydraulic oil supplied to the small chamber unnecessary, which otherwise causes the problem of lowering the fuel efficiency due to the waste of the hydraulic energy.

SUMMARY OF THE INVENTION

Accordingly, the present invention has been made to solve the aforementioned problems occurring in the related art, and it is an object of the present invention to provide a flow control valve for a construction equipment that can improve the fuel efficiency by reducing the hydraulic oil from the hydraulic actuator when the pressure of the hydraulic oil returning to the hydraulic oil tank from the hydraulic actuator is higher than the predetermined pressure.

TECHNICAL SOLUTION

To achieve the above and other objects, in accordance with an embodiment of the present invention, there is provided a flow control valve for a construction equipment comprising; a valve body installed on the path between a hydraulic pump and a hydraulic actuator and configured with a supply path communicating with a pump path supplying the hydraulic oil from the hydraulic pump and the actuator ports (6, 7) connected to the hydraulic actuator;

a switchable spool provided within the valve body so that by switching, the hydraulic oil of the hydraulic pump is supplied to the hydraulic actuator, and a hydraulic oil discharged from the hydraulic actuator is returned to a hydraulic oil tank;

a pressure chamber provided within the spool, which communicates with the supply path and an actuator port on one side;

a signal pressure path provided within the spool, which communicates with the actuator port on the other side and the pressure chamber; and a flow control valve provided within the pressure chamber, which is switched by the returning oil supplied through the signal pressure path and blocks the opening part when the pressure of the hydraulic oil returning to the hydraulic oil tank from the hydraulic actuator exceeds the predetermined pressure.

The flow control valve is configured with a first path formed in the spool so as to communicate with the supply path, a second path communicating with the actuator port on one side, of which the opening area is controlled when the flow control valve is switched by the hydraulic oil supplied to the hydraulic actuator from the hydraulic pump as the spool is switched, and a third path communicating with a first path and a second path of the flow control valve.

The flow control valve is configured with a valve spring to support elastically the maximum open state of the opening part of the flow control valve as the initial state.

The flow control valve is configured with a drain path formed in a spool so as to communicate with a back pressure chamber and a tank path and to remove the remaining pressure of the back pressure chamber by the valve spring.

The flow control valve is also configured with a plug installed on an arbitrary position along a third path so as to prevent the hydraulic oil from flowing reversely to the actuator port on the other side as the hydraulic oil is supplied to the actuator port on one side.

Advantageous Effect

According to the embodiment of the present invention having the above-described configuration, a flow control valve for a construction equipment can bring the effect of improving the fuel efficiency by avoiding the unnecessary consumption of the hydraulic oil as the spool is switched by the returning oil from the hydraulic actuator and thereby blocking the hydraulic oil supplied from the hydraulic actuator when the pressure of the hydraulic oil returning to the hydraulic oil tank from the hydraulic actuator is higher than the predetermined pressure. In addition, since the flow control valve is provided within the spool, the configuration allows the main control valve (MCV) to be arranged easily and increases the design flexibility.

BRIEF DESCRIPTION OF THE DRAWINGS

FIG. 1 is the end view of the flow control valve for the construction equipment according to the conventional technology.

FIG. 2 is the end view of the flow control valve for the construction equipment according to an embodiment of the present invention.

FIG. 3 is the end view of the main parts of the flow control valve shown in FIG. 2.

EXPLANATION OF REFERENCE NUMERALS FOR MAIN PARTS IN THE DRAWING

1: Hydraulic actuator
2: Valve body
3: Spool
4: Pump path
5: Supply path
6, 7: Actuator port
10: Tank path
11: Check valve
12: Pressure chamber
13, 14: Signal pressure path
15: Flow control valve
16, 17: First path
18, 19: Second path
20: Third path
21: Valve spring
22: Backward pressure chamber
23: Drain path

DETAILED DESCRIPTION OF THE INVENTION

Hereinafter, the flow control valve for the construction equipment according to a preferred embodiment of the present invention will be described in detail with reference to the accompanying drawings.

FIG. 2 is the end view of the flow control valve for the construction equipment according to an embodiment of the present invention, and FIG. 3 is the end view of the main parts of the flow control valve shown in FIG. 2.

With reference to FIG. 2 and FIG. 3, the flow control valve for the construction equipment according to an embodiment of the present invention is provided with a valve body (2) installed on the path between a hydraulic pump (not shown) and a hydraulic actuator (1) (e.g. boom cylinder making a boom up and down). Within the valve body (2) is provided a switchable spool (3) that by switching the same, supplies the hydraulic oil of the hydraulic pump thru an actuator port (6) on one side to the hydraulic actuator (1) and returns a hydraulic oil discharged from the hydraulic actuator (1) through an actuator port (7) on the other side to a hydraulic oil tank (not shown).

The valve body (2) is provided with a pump path (4) supplying the hydraulic oil from the hydraulic pump, a supply path (5) communicating with a pump path (4) and the actuator ports (6, 7) connected to the hydraulic actuator (1).

Within the spool (3) is provided a pressure chamber (12) that communicates with the supply path (5) and an actuator port (6) on one side.

Within the spool (3) is provided a signal pressure path (13, 14) that communicates with the actuator port (7) on the other side and the pressure chamber (12), through which the hydraulic oil returning from the hydraulic actuator (1) to the actuator port (7) on the other side is supplied as a signal pressure to the pressure chamber (12) when the pressure of the returning oil exceeds the predetermined pressure (referring to the combined force of the elastic force of a valve spring (21) plus the pressure of a back pressure chamber (22)).

The signal pressure path (13) is formed in the radial direction of the spool (3) so as to communicate with the actuator port (7) on the other side, and the signal pressure path (14) is formed in the axial direction of the spool (3) so as to communicate with the signal pressure path (13) and the pressure chamber (12).

Within the pressure chamber is provided a flow control valve (15) that is switchable and blocks the opening part by the switching activated by the returning oil through the signal pressure paths (13, 14) when the hydraulic oil returning from the hydraulic actuator (1) thru the actuator port (7) on the other side to the hydraulic oil tank exceeds the predetermined pressure A first path (16) communicating with the supply path (5) is formed in the radial direction of the spool (3), while a first path (17) communicating with the first path (16) is formed in the axial direction at the arbitrary position of the flow control valve (15).

A second path (18) communicating with the actuator port (6) on one side is formed in the radial direction of the spool (3), while a second path (19) communicating with the second path (18) is formed in the axial direction at the arbitrary position of the flow control valve (15). The opening area of the second path (19) of the flow control valve (15) is controlled when the flow control valve (15) is switched by the hydraulic oil supplied to the hydraulic actuator (1) from the hydraulic pump as the spool (3) is switched.

A third path (20) communicating with the first path (17) and the second path (19) is formed in the axial direction of the flow control valve (15).

A drain path (23) is formed in the axial direction of the spool (3) so as to communicate with the back pressure chamber (22) and the tank path (10), and to remove the remaining pressure of the back pressure chamber (22) when the flow control valve (15) is switched.

A plug (24) is installed on an arbitrary position along the third path (20) of the flow control valve (15) so as to prevent the hydraulic oil of the hydraulic pump from flowing reversely to the actuator port on the other side as the hydraulic oil is supplied to the actuator port on one side (6 or 7).

According to the configuration as described above, the spool (3) is shifted to the left side in the figure by the pilot signal pressure in the right side of the spool (3). (At this time, the flow control valve (15) is supported by the valve spring (21) and not switched.) On the other hand, the check valve (11) is moved upwards in the figure and opened by the hydraulic oil supplied to the pump path (4) from the hydraulic pump.

Accordingly, the hydraulic oil supplied to the pump path (4) from the hydraulic pump passes through the path that is opened by the check valve(11), and delivered to the supply path (5). The hydraulic oil delivered to the supply path (5) passes through the following paths in order by the switching of the spool (3), i.e. the first path (16) communicating with the supply path (5), the first path (17) of the flow control valve (15), the third path (20), the second path (19), and the second path (18) of the spool (3), and is supplied to the actuator port on one side (6). At this moment, the hydraulic oil delivered from the supply path (5) to the actuator port on one side (6) is prevented from flowing reversely to the actuator port on other side (7) by the plug (24) installed in the third path (20) of the flow control valve (15).

At the same time, the hydraulic oil discharged from the hydraulic actuator (1) passes through the actuator (7) on the other side, the notch (9) of the spool (3), and the tank path (10) in order, and returns to the hydraulic oil tank. Thus, the hydraulic actuator (1) is actuated in contraction.

When the hydraulic oil returning from the hydraulic actuator (1) through the actuator port (7) on the other side to the hydraulic oil tank exceeds the predetermined pressure, the returning oil is provided as the signal pressure through the signal pressure paths (13, 14) communicating with the actuator port (7) on the other side.

That is, since the pressure of the returning oil exceeding the combined force of the elastic force of the valve spring (21) plus the pressure of the back pressure chamber (22) is applied in the left side of the flow control valve (15), the flow control valve (15) is switched to the right side. At this moment, the remaining pressure of the back pressure chamber (22) is discharged through the drain path (23) of the spool (3) to the tank path (10) and the valve spring (21) is put in the compression.

As mentioned above, when the flow control valve (15) is switched by the hydraulic oil returning to the hydraulic tank from the hydraulic actuator (1), the second path (19) of the flow control valve (15) is blocked from the second path (18) of the spool (3). That is, even when the first path (16) of the spool (3) is communicated with the supply path (5) by the switching of the spool (3), the path between the supply path (5) and the actuator port (6) on one side is blocked.

Accordingly, since the flow control valve (15) is switched with the opening of the same closed, the hydraulic oil can be saved, which is supplied from the hydraulic pump through the pump path (4), the supply path (5), and the actuator port (6) on one side successively to the hydraulic actuator.

On the other hand, when the hydraulic oil is not supplied anymore to the small chamber of the hydraulic actuator (1) as the hydraulic oil of the large chamber of the hydraulic actuator (1) returns to the hydraulic oil tank (the case that the pressures of the first path (16) of the spool (3), and the first path (17) and the third path (20) of the flow control valve (15) are below the predetermined pressure), the combined force of the elastic force of the valve spring (21) plus the pressure of the back pressure chamber (22) exceeds the predetermined pressure. As a result, the flow control valve (15) is switched to the left side in the figure returning to the initial position, and thus the opening of the flow control valve (15) can be kept in the maximum open state.

Although the present invention has been described with reference to the preferred embodiment in the attached figures, it is to be understood that various equivalent modifications and variations of the embodiments can be made by a person having an ordinary skill in the art without departing from the spirit and scope of the present invention as recited in the claims.

INDUSTRIAL APPLICABILITY

According to the present invention having the above-described configuration, the fuel efficiency can be improved as the hydraulic oil supplied from the hydraulic actuator is reduced when the pressure of the hydraulic oil returning to the hydraulic oil tank from the hydraulic actuator is higher than the predetermined pressure.

What is claimed is:

1. A flow control valve for a construction equipment comprising; a valve body installed on the path between a hydraulic pump and a hydraulic actuator and configured with a supply path communicating with a pump path supplying the hydraulic oil from the hydraulic pump and actuator ports connected to the hydraulic actuator;

a spool provided within the valve body so that by switching, the hydraulic oil of the hydraulic pump is supplied to the hydraulic actuator, and a hydraulic oil discharged from the hydraulic actuator is returned to a hydraulic oil tank;

a pressure chamber provided within the spool, which communicates with the supply path and an actuator port on one side;

a signal pressure path provided within the spool, which communicates with the actuator port on the other side and the pressure chamber; and a flow control valve provided within the pressure chamber, wherein when the pressure of the hydraulic oil returning to the hydraulic oil tank from the hydraulic actuator exceeds a predetermined pressure, the flow control valve is switched by the hydraulic oil discharged from the hydraulic actuator supplied through the signal pressure path and blocks an opening area of the flow control valve.

2. The flow control valve for the construction equipment of claim 1, wherein the flow control valve is configured with a first path formed in the spool so as to communicate with the supply path, a second path communicating with the actuator port on one side, of which the opening area of the flow control valve is controlled when the flow control valve is switched by the hydraulic oil supplied to the hydraulic actuator from the hydraulic pump as the spool is switched, and a third path communicating with the first path and the second path of the flow control valve.

3. The flow control valve for the construction equipment of claim 1, wherein the flow control valve is configured with a valve spring to support elastically the maximum open state of the opening part of the flow control valve as the initial state.

4. The flow control valve for the construction equipment of claim 3, wherein a drain path is configured in the spool so as to communicate with a back pressure chamber and a tank path and to remove the remaining pressure of the back pressure chamber by the valve spring.

5. The flow control valve for the construction equipment of claim 2, wherein a plug is installed on an arbitrary position along the third path of the flow control valve so as to prevent the hydraulic oil from flowing reversely to the actuator port on the other side as the hydraulic oil of the hydraulic pump is supplied to the actuator port on one side.

* * * * *